United States Patent
O'Connor et al.

(10) Patent No.: US 9,334,649 B2
(45) Date of Patent: May 10, 2016

(54) THERMALLY INSULATED INDUSTRIAL FREEZER STRUCTURE AND SYSTEM

(71) Applicant: Leprino Foods Company, Denver, CO (US)

(72) Inventors: Jeremiah C. O'Connor, Lakeville, MN (US); Joshua Chun, V, Denver, CO (US); Mark Cramer, Denver, CO (US); Dennis Klakring, Bella Vista, AZ (US)

(73) Assignee: Leprino Foods Company, Denver, CO (US)

( * ) Notice: Subject to any disclaimer, the term of this patent is extended or adjusted under 35 U.S.C. 154(b) by 369 days.

(21) Appl. No.: 13/930,810

(22) Filed: Jun. 28, 2013

(65) Prior Publication Data

US 2015/0000314 A1    Jan. 1, 2015

(51) Int. Cl.
*E04B 5/48* (2006.01)
*F25C 1/00* (2006.01)
*F25D 23/06* (2006.01)
*F25D 13/00* (2006.01)

(52) U.S. Cl.
CPC ... *E04B 5/48* (2013.01); *F25C 1/00* (2013.01); *F25D 13/00* (2013.01); *F25D 23/06* (2013.01); *F25D 23/061* (2013.01); *F25D 23/067* (2013.01); *F25D 23/068* (2013.01); *F25D 2400/22* (2013.01); *Y02B 80/40* (2013.01)

(58) Field of Classification Search
CPC .......... E04B 5/48; F25D 13/00; F25D 23/06; F25D 23/061; F25D 23/067; F25D 23/068; F25D 2400/22; F25C 1/00
See application file for complete search history.

(56) References Cited

U.S. PATENT DOCUMENTS

| | | |
|---|---|---|
| 1,693,855 A | 12/1928 | Moore |
| 1,921,865 A | 8/1933 | Curtis |
| 2,107,400 A | 2/1938 | Stabbal |
| 2,159,406 A | 5/1939 | Schwebs |
| 2,165,580 A | 7/1939 | Scheufler |
| 2,441,889 A | 5/1948 | Larkin |
| 2,780,923 A | 2/1957 | Jones |
| 3,246,592 A | 4/1966 | Rath |
| 3,746,388 A | 7/1973 | Robinson |

(Continued)

FOREIGN PATENT DOCUMENTS

| | | |
|---|---|---|
| GB | 2 136 550 A | 9/1984 |
| GB | 2 203 463 A | 10/1988 |

OTHER PUBLICATIONS

Written Opinion of the International Preliminary Examining Authority mailed Aug. 17, 2015, issued in corresponding International Application No. PCT/US2014/043242, filed Jun. 19, 2014, 8 pages.

(Continued)

*Primary Examiner* — Marc Norman
(74) *Attorney, Agent, or Firm* — Christensen O'Connor Johnson Kindness PLLC (57) ABSTRACT

A freezer structure (12) includes a floor structure (20), side walls (22) and a ceiling (24), each of which includes a substantially hollow inner or upper layer or zone (30) behind or beneath which is disposed an intermediate layer or zone (32) substantially filled with insulating filler material and a bottom or outer layer or zone (34) that is substantially hollow. A monitoring system (16) monitors the temperature, moisture level and pressure of a substantially dry gas circulating through the first layer or zone to maintain the first layer or zone in substantially dry condition.

22 Claims, 11 Drawing Sheets

(56) References Cited

U.S. PATENT DOCUMENTS

| | | | |
|---|---|---|---|
| 4,106,305 A | 8/1978 | Ibrahim | |
| 4,565,071 A | 1/1986 | Bartling | |
| 4,565,074 A * | 1/1986 | Morgan | F25D 3/08 108/901 |
| 5,054,843 A | 10/1991 | Gray | |
| 6,427,475 B1 * | 8/2002 | DeFelice | F25D 3/08 62/457.2 |
| 6,536,228 B1 | 3/2003 | Hall | |
| 2007/0289976 A1 | 12/2007 | Meyer | |

OTHER PUBLICATIONS

International Search Report and Written Opinion mailed Sep. 29, 2014, issued in corresponding International Application No. PCT/US2014/043242, filed Jun. 19, 2014, 10 pages.

\* cited by examiner

THERMALLY INSULATED INDUSTRIAL FREEZER STRUCTURE AND SYSTEM

FIELD OF THE INVENTION

The present invention relates to an industrial freezer structure and system for the cold storage of food and other goods.

BACKGROUND

Enclosures for industrial freezers in food processing facilities have always been a source of concern when it comes to hygienic design. The original caulked, sealed, interior panels still in use today require constant inspection and maintenance of the joints to keep water and product debris from entering the insulated spaces. Industrial freezers have been constructed with a fully welded stainless steel insulated enclosure. This has provided a significant improvement over prior freezers due to no longer having to rely on caulked joints for sealing the interior panels of the freezer relative to each other, although, over time, even this design develops leaks that allow moisture to migrate into the sealed insulated spaces. The freezer structure of the present disclosure seeks to address this issue with the fully seal welded stainless steel freezer design.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present disclosure provides a freezer structure wherein the insulation is fully sealed in a separate space not in direct contact with the inside surfaces of the freezer enclosure. In addition, a separate, sealed chamber is disposed between the inside enclosure surface and the sealed insulated space of sufficient size to enable the separate sealed chamber to be visually inspected, monitored with sensors, conditioned, cleaned, and sanitized.

A thermally insulated floor structure for an industrial freezer includes a first zone of substantially hollow configuration, configured to support a load-bearing deck thereon, and a second zone substantially coexistent with the first zone and substantially isolated from the first zone. The second zone is substantially occupied by a thermally insulated material enclosed in a fluid-impervious envelope. The first zone includes at least one inlet through which a medium enters the first zone for circulation therethrough, and at least one outlet through which the circulation medium exits the first zone.

A thermally insulated floor structure wherein the fluid medium includes a gas, a gas mixture to assist in maintaining the first layer in substantially dry condition, a fluid to sterilize the first layer and/or maintain the first layer in sterilized condition, or a fluid to assist in thawing the ice formed in the first layer.

The thermally insulated floor structure wherein the second zone is substantially sealed from the interior and the fluid-impervious envelope used to enclose the thermally insulating material comprises a foil-type material.

The thermally insulated floor structure further including a third zone disposed along the second zone opposite to the location of the first zone. A third zone being substantially closed from the environment and disposed beneath the second zone.

A thermally insulated load-bearing floor structure includes a first layer constructed to define a hollow chamber and load-bearing members to support an overhead load-bearing deck, and a second layer underlying the first layer and constructed to support the first layer, with the second layer being substantially occupied by thermally insulated material. The floor structure is constructed to substantially isolate the first layer from the second layer. In addition, a circulation system is provided to circulate selected fluids through the first layer, with such fluids selected from a group consisting of a gas or gas mixture to assist in maintaining the first layer in substantially dry condition, a fluid to sterilize the first layer and/or maintain the first layer in sterilized condition, or a fluid to assist in thawing ice formed in the first layer. A monitoring system is provided for monitoring one or more of the temperature, pressure, and moisture levels in the substantially hollow first layer.

The thermally insulated load-bearing floor system wherein the circulating fluids comprise one or more of dry, low dew point air; steam; air together with an anti-bacterial agent; or an inert gas.

The thermally insulated load-bearing floor system wherein the monitoring system sensing one or more of the dew point of the fluid within the first layer, the volume of the fluid circulating through the first layer, and the pressure of the fluid circulating through the first layer.

The thermally insulated load-bearing floor system, wherein the floor structure further includes a third layer beneath the second layer, the third layer extending between the underside of the second layer, and the surface beneath the second layer. In addition, the third layer is formed by spacers underlying the second layer.

A freezer constructed from a first layer adjacent the interior of the freezer and configured to define a substantially hollow chamber and a second layer disposed outwardly of the first layer. The second layer is substantially occupied by thermally insulating material. In addition, the second layer is substantially isolated from the first layer. A fluid circulation system is provided to circulate a substantially dry gas for the first layer at a flow rate to maintain the first layer in substantially dry condition. In addition, a monitoring system is provided to monitor one or more of the temperature, pressure, and moisture level within the first layer.

The freezer wherein the first and second layers comprise the floor structure of the freezer. The freezer also including upright walls that join to the floor structure such that the interior of the upright walls are in fluid flow communication with the interior of the first layer of the floor structure.

The freezer, further including a third layer disposed beneath the second layer. The third layer including spacer members that underlie the second layer to space the second layer above the surface beneath the second layer.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

Figure 1:
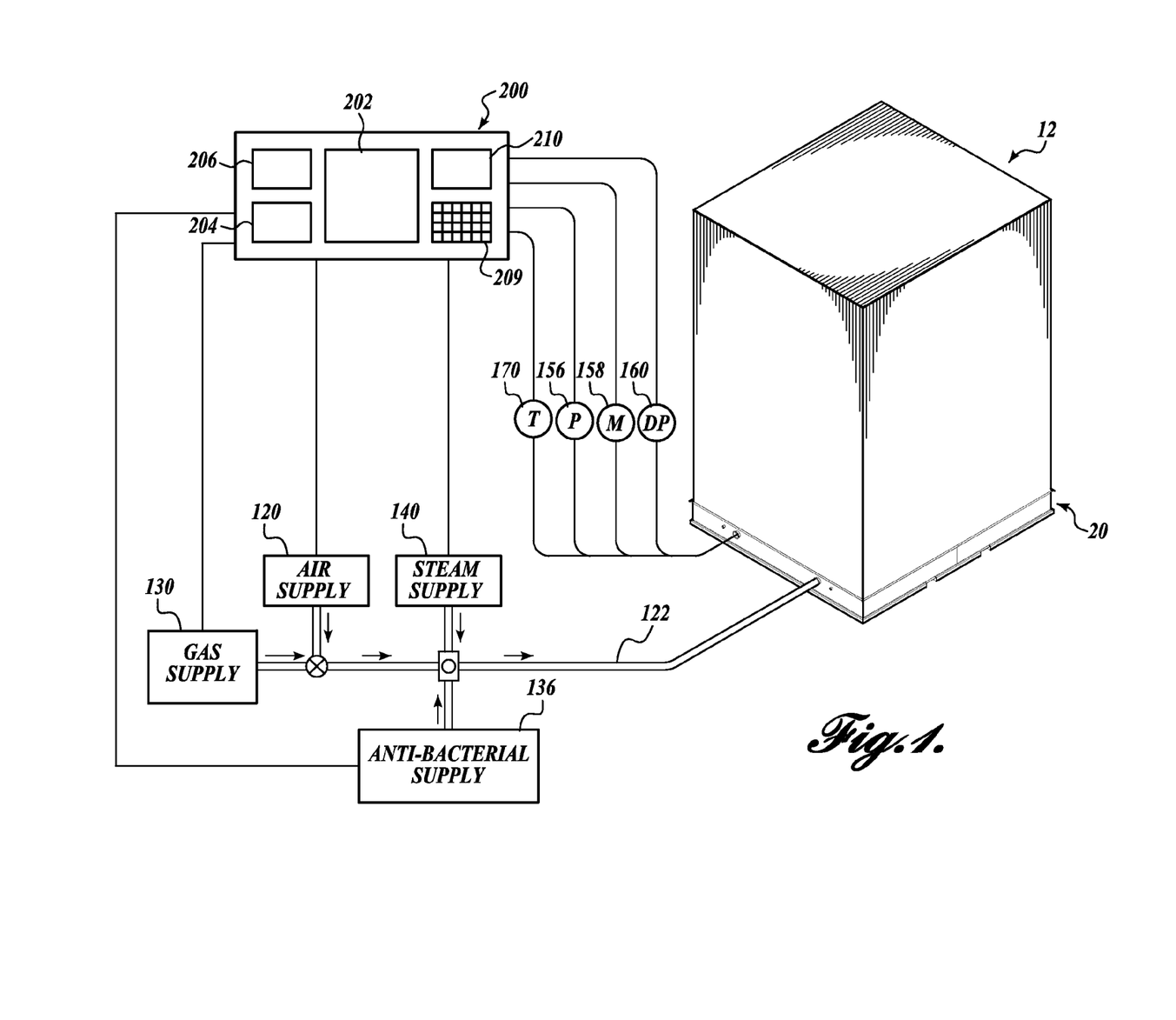
FIG. 1 is a representative schematic view of the enclosure system of the present disclosure.

Referring initially to FIG. 1, freezer system 10 includes a freezer structure 12 and a control system 14 for controlling the operation in the freezer system. A monitoring system 16 monitors the operational parameters for the freezer system, including the temperature thereof, and sends this information to the control system. The control system controls the operation of a circulation system 18 to circulate various fluids through the freezer system for the control of the freezer system and the maintenance thereof. These major systems of the freezer system 10 are more fully described below.

Figure 2:
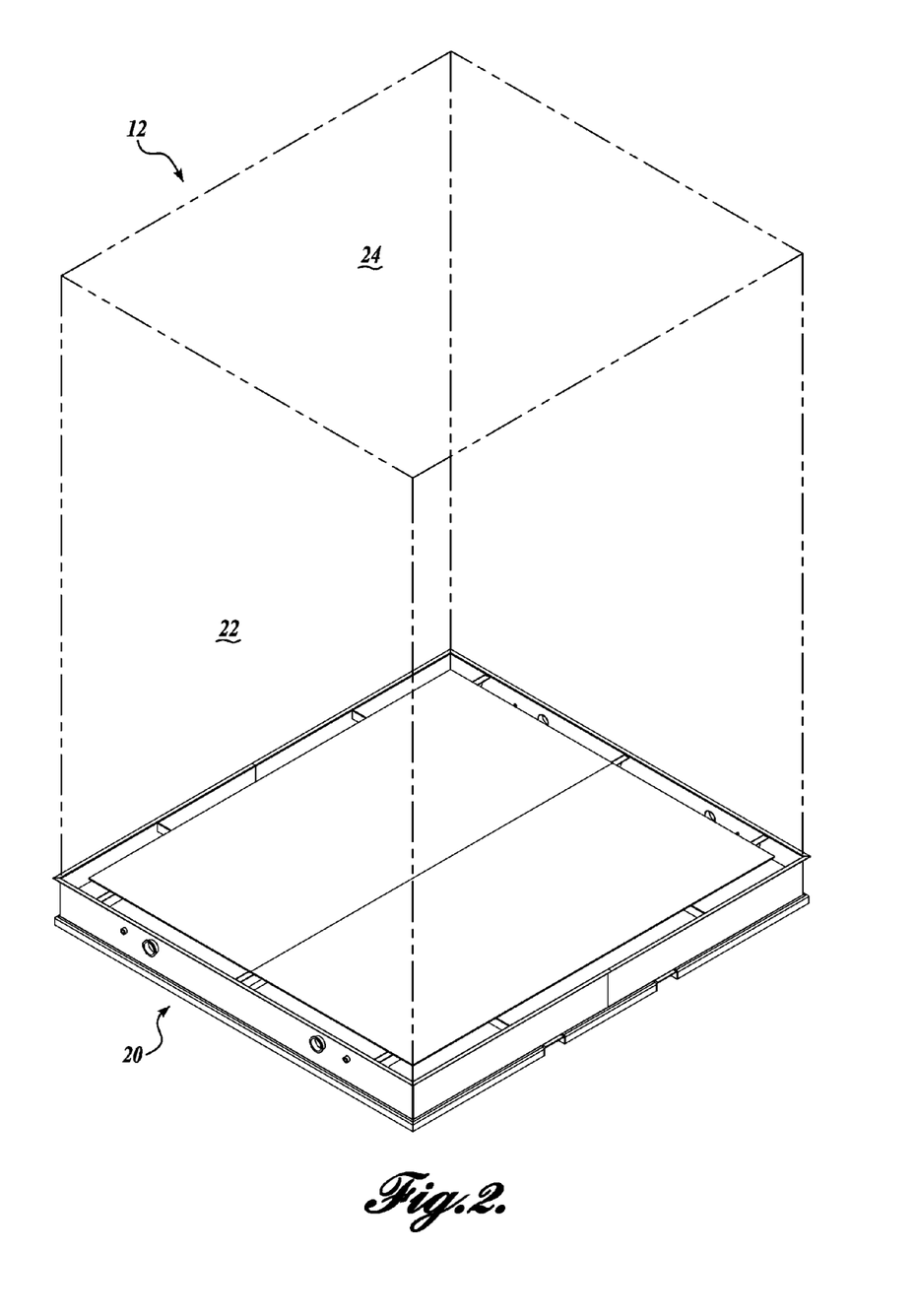
FIG. 2 is an isometric view, partially in schematic, of a freezer structure according to the present disclosure.
Figure 3:
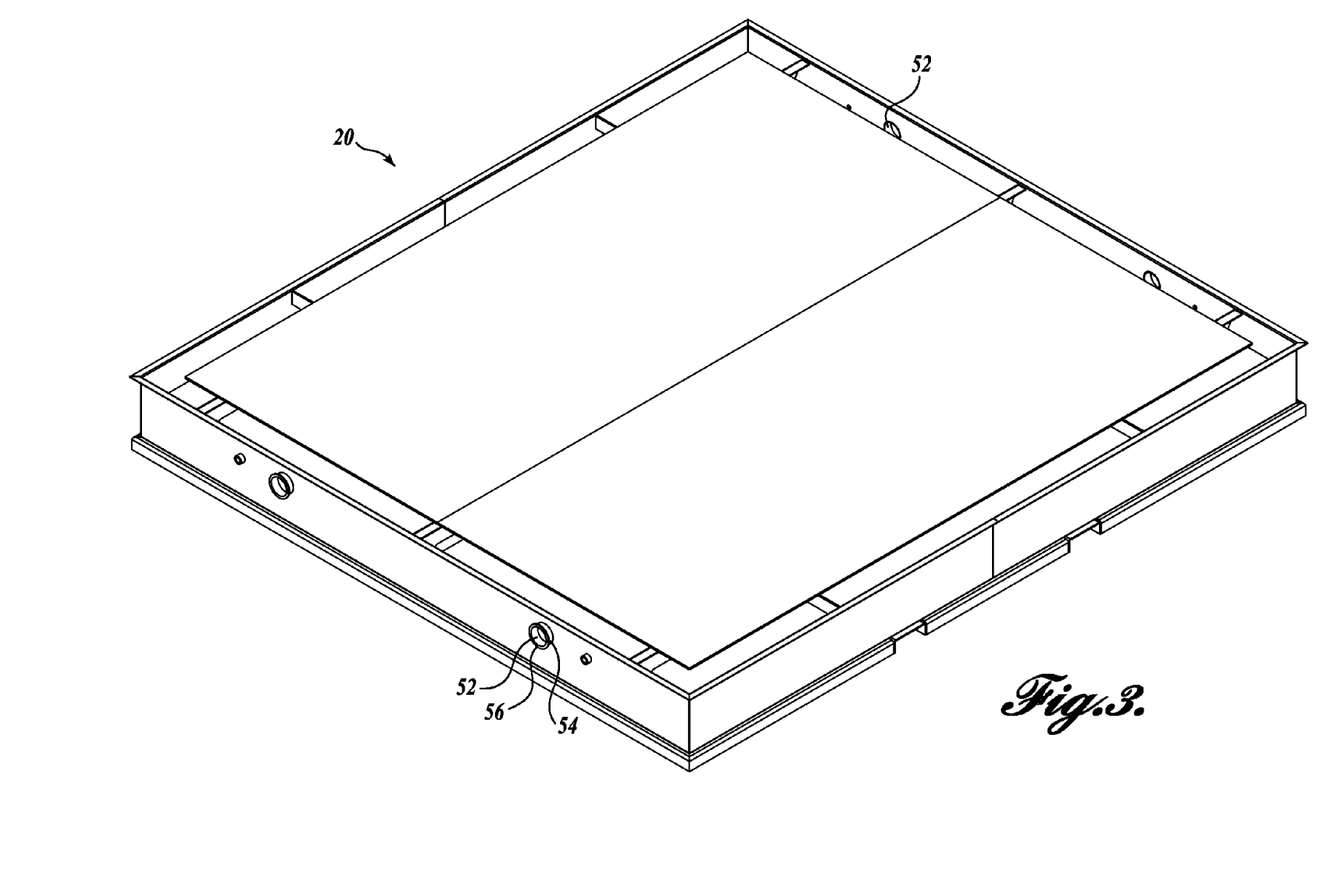
FIG. 3 is an isometric view of the floor structure of the freezer structure of the present disclosure.
Figure 11:
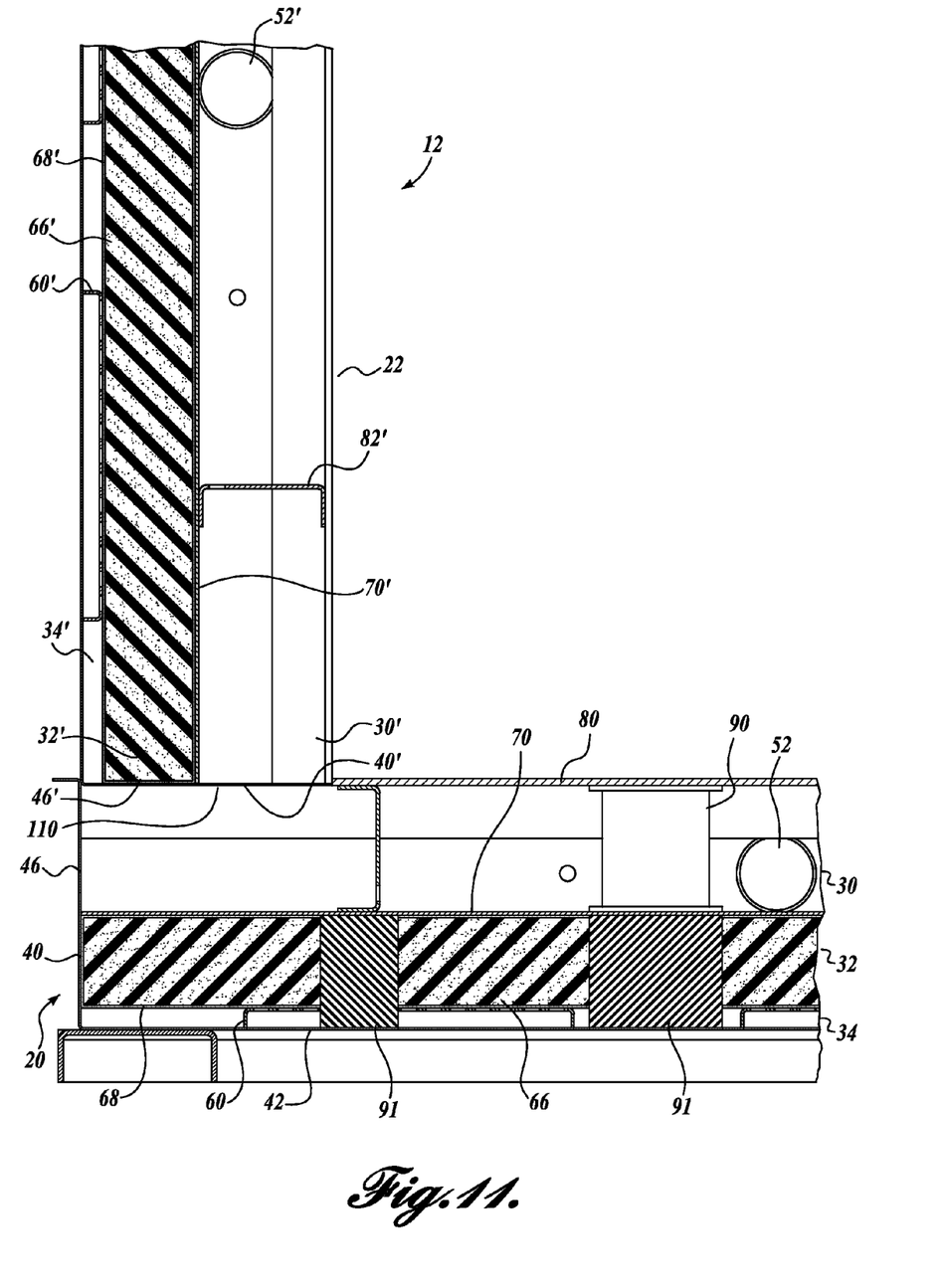
FIG. 11 is an enlarged, partial cross-sectional view of the floor structure shown in FIG. 3 as well as a corresponding wall section.

Next, referring to FIGS. 2, 3 and 11, the freezer structure 12 includes a floor structure 20, sidewalls 22, and a ceiling 24. One or more doors, not shown, can be incorporated into the sidewall. The floor structure 20, sidewalls 22, and ceiling 24, and the door(s) can be constructed similarly. As such, the following description will focus primarily on the construction of the floor structure 20.

Figure 9:
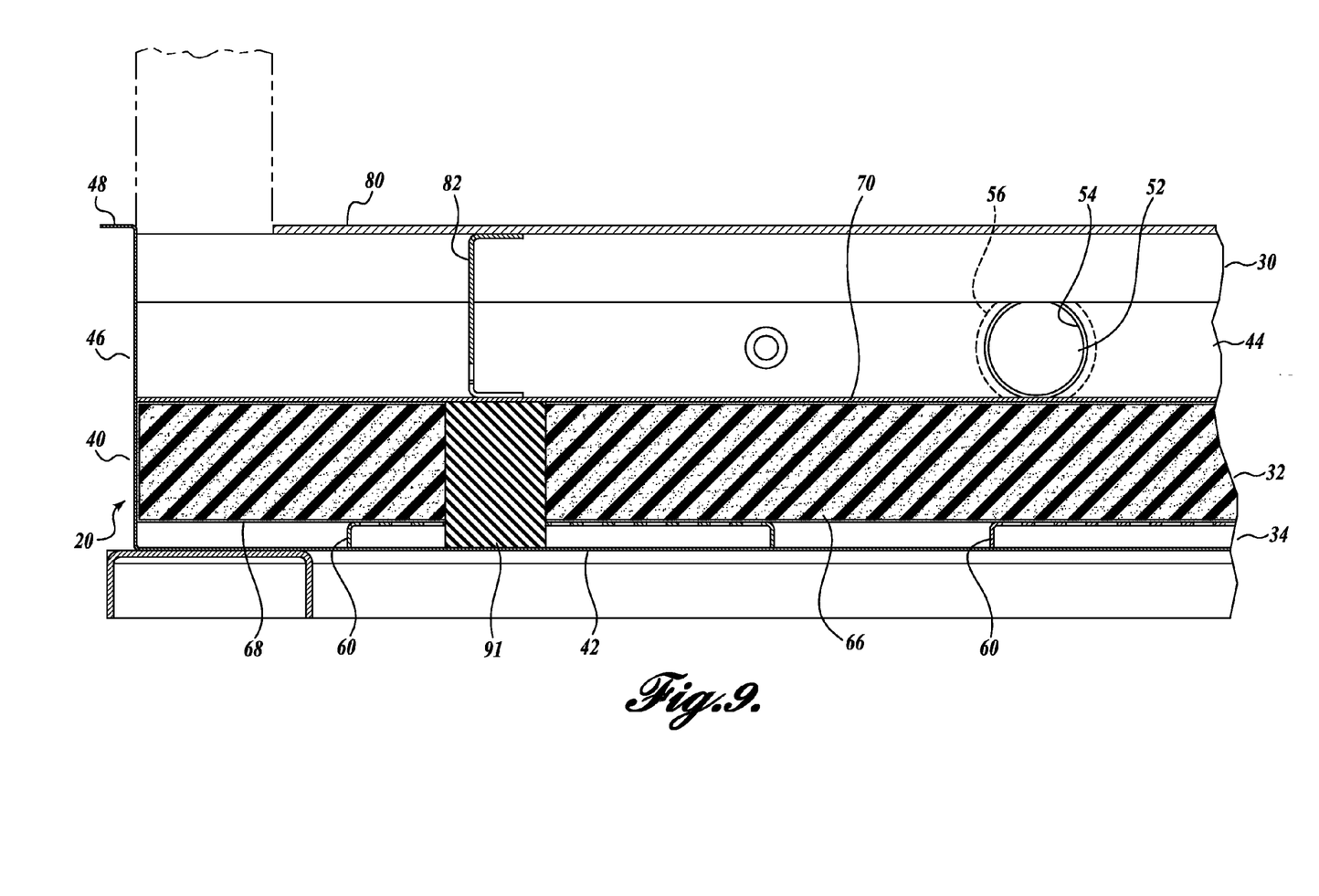
FIG. 9 is an enlarged, partial cross-sectional view of the floor structure shown in FIG. 3.
Figure 10:
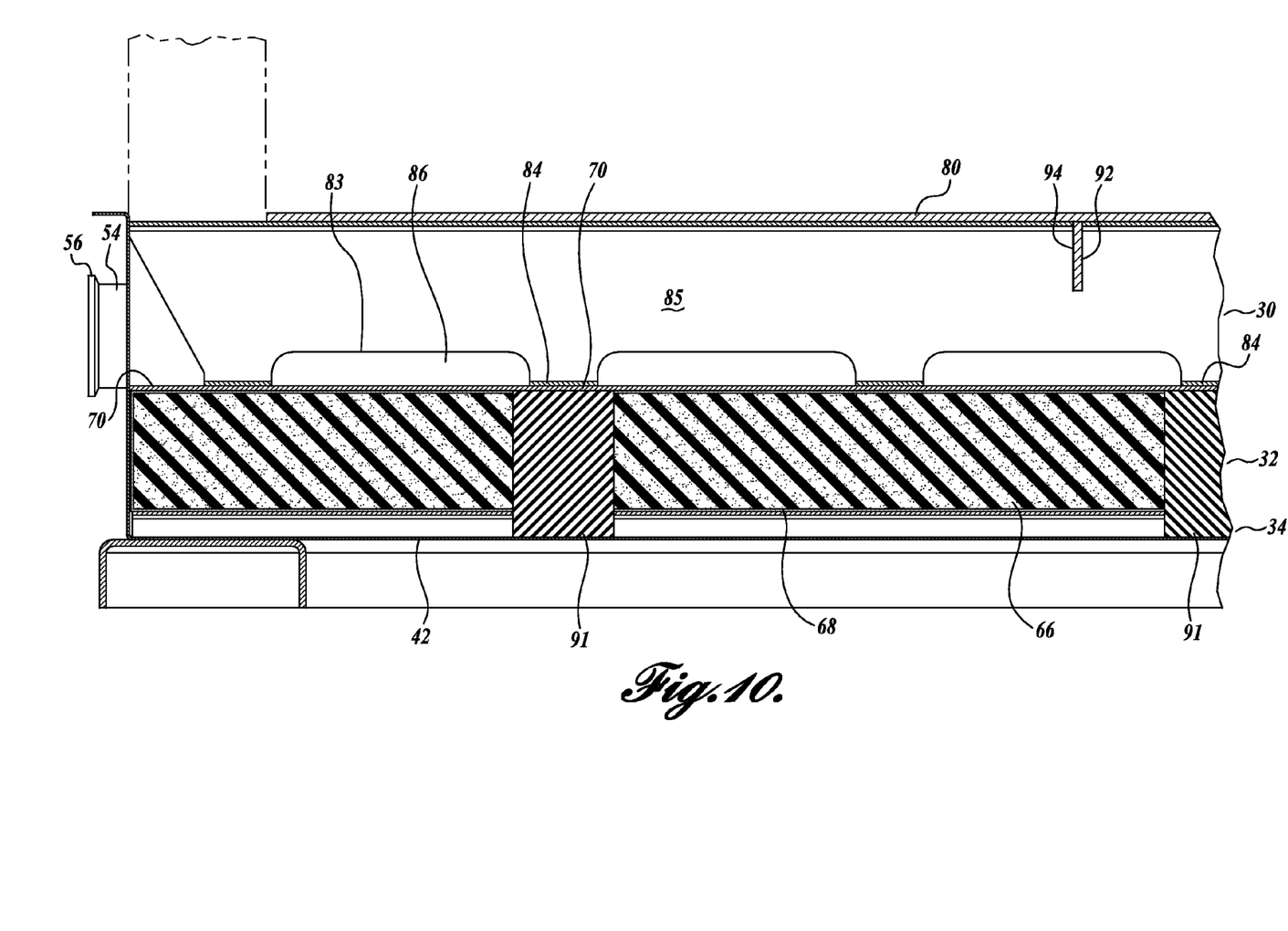
FIG. 10 is an enlarged, partial cross-sectional view of the floor structure shown in FIG. 3.

Referring specifically to FIGS. 9, 10 and 11, the floor structure in basic form is composed of an upper layer or zone 30, an intermediate layer or zone 32, and a bottom layer or zone 34. These three layers are constructed as a unitary structure.

Figure 4:
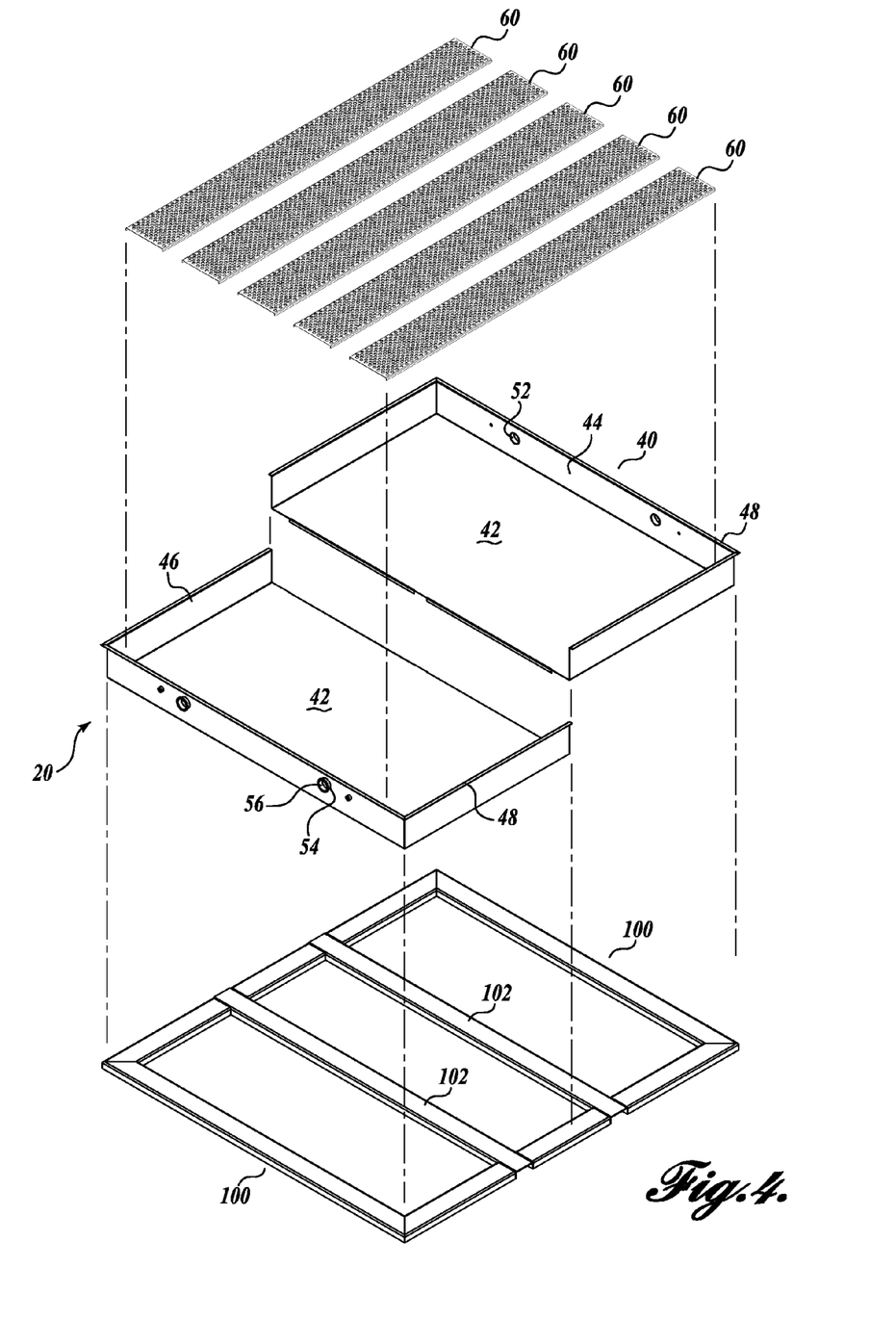
FIG. 4 is an exploded isometric view showing portions of the components of the floor structure of FIG. 3.

Referring to FIG. 4, the floor structure 20 includes a pan structure 40 having a flat base surface 42, with parallel sidewalls 44 extending upwardly from the opposite sides of the base surface 42, and parallel sidewalls 46 extending upwardly from the other of the two opposite edges of the base surface 42. An outwardly extending rim 48 extends outwardly from the upper edges of the sidewalls 44 and 46. Also, a center flange or rib 50 extends beneath the pan structure 40, parallel to the sidewalls 44. The center rib 50 may be continuous below the base surface 42, or instead may be disposed in sections beneath and across the base surface. In the pan structure 40, the intersection between the sidewalls 44 and 46 with the base surface 42 forms a sealed joint, not allowing any fluids to pass therebetween. The same is true at the junctures of the sidewalls forming the corners of the pan structure 40.

Although shown in FIG. 4 as constructed of two halves joined together, the pan structure 40 can be constructed as a singular unit. Also, the pan structure could instead be of other constructions, such as of a separate base 42 and separate side walls 44 and 46 that are joined at the base.

As shown most clearly in FIGS. 3-7, openings 52 are formed in the sidewalls 44. Each such opening is defined by a circular hole formed in the sidewalls 44 and a short throat 54 in communication with the opening 52. Flange 56 encircles the end of the throats 54 opposite while opening 52.

Referring to FIG. 4, a plurality of spaced apart spacer members 60 extend across the base surface 42 of the pan structure 40. These spacer members 60 can be of various constructions, including in the form of shallow channels, planks, shallow tubular members, etc. Also, the spacer members can be of solid construction or can be of pervious construction, for example, perforated, or composed of expanded metal.

Figure 5:
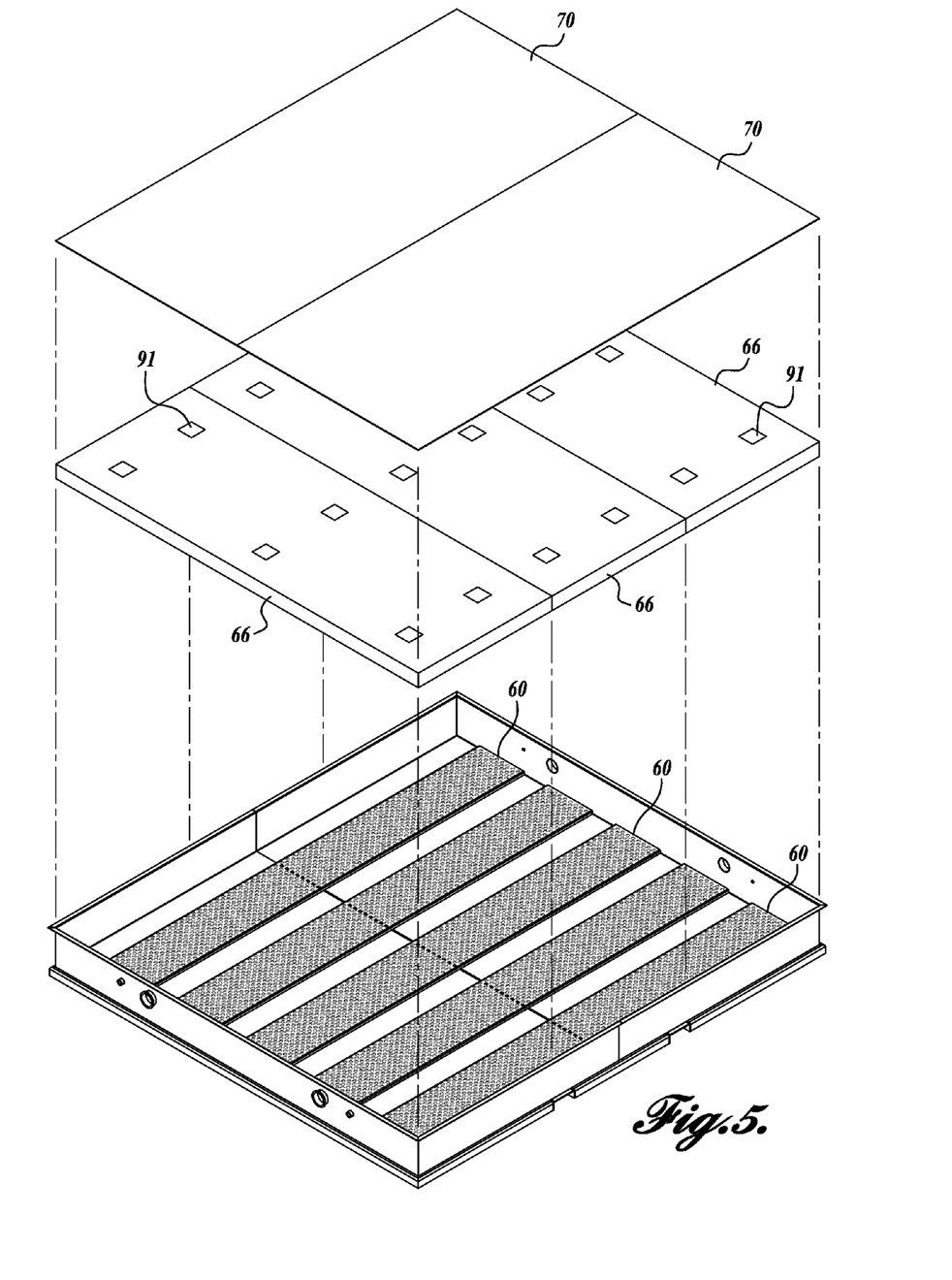
FIG. 5 is an exploded isometric view showing additional components of the floor structure of FIG. 3.

As shown in FIG. 5, a layer of thermal insulation 66 overlies the spacer members 60. The thermal insulation layer may be in the form of a single member or may be composed of a plurality of sections. Also, the insulation layer may be of various compositions, including composed of a dense, closed cell material to enable the insulation layer to also perform a load-bearing function. In this regard, the insulation layer can be of various compositions, for example, composed of polyisocyanurate, polyurethane, and polystyrene of a desired density. The composition and/or thickness of the thermal insulating layer 66 may be designed to achieve a desired "R" rating for the insulation.

To assist in keeping the thermal insulation separate and isolated from the rest of the floor structure 20, the thermal insulation may be encased or wrapped in an envelope 68 (see FIGS. 9-11) of tough, impervious material, for example, foil or Mylar. As a consequence, even if there is a breach in the floor structure 20, any liquids or fluids that may flow through the breach will not reach the thermal insulation layer 66, thereby avoiding contamination of the insulation layer.

A top sheet or layer 70 overlies a top of the thermal insulation layer 66. This top layer may be composed of a solid metallic structural material. The top layer may be of other compositions, such as composed of a honeycomb structure or other structure, but with a continuous upper and lower surface. The perimeter of the top layer is sealed against the sidewalls 44 and 46 of the pan structure 40, for example, by welding. As a consequence, the thermal insulation layer 66 forms a sealed construction from the remainder of the floor structure. This insulation layer forms the intermediate layer 32 of the floor structure 20.

The relatively narrow space or layer 34 below the thermal insulating layer 66, created by a spacer member 60, keeps the insulation layer spaced from the base surface 42 of the pan structure 40. As a consequence, the second layer is subjected to reduced thermal stress relative to if the thermally insulating layer 66 were in direct contact with base surface 42. Moreover, as discussed more fully below, this bottom layer 34 can be monitored for temperature and/or other physical parameters. Such monitoring can indicate whether the insulation layer 66 is functioning properly or not.

Referring to FIGS. 6-10, above intermediate layer 32, the floor structure 20 includes the upper layer 30 formed between the top sheet or layer 70 and a load carrying deck 80 that is coplanar with the rim 48 of pan structure 40. The deck is supported above the top sheet or layer 70 by a series of load bearing support members 82 that extend across the top sheet or layer 70 parallel to sidewalls 46. The support members 82 support the deck 80 above the top sheet or layer 70. Although three support members 82 are shown in parallel, spaced apart relationship from each other, a different number of support members may be utilized.

Figure 6:
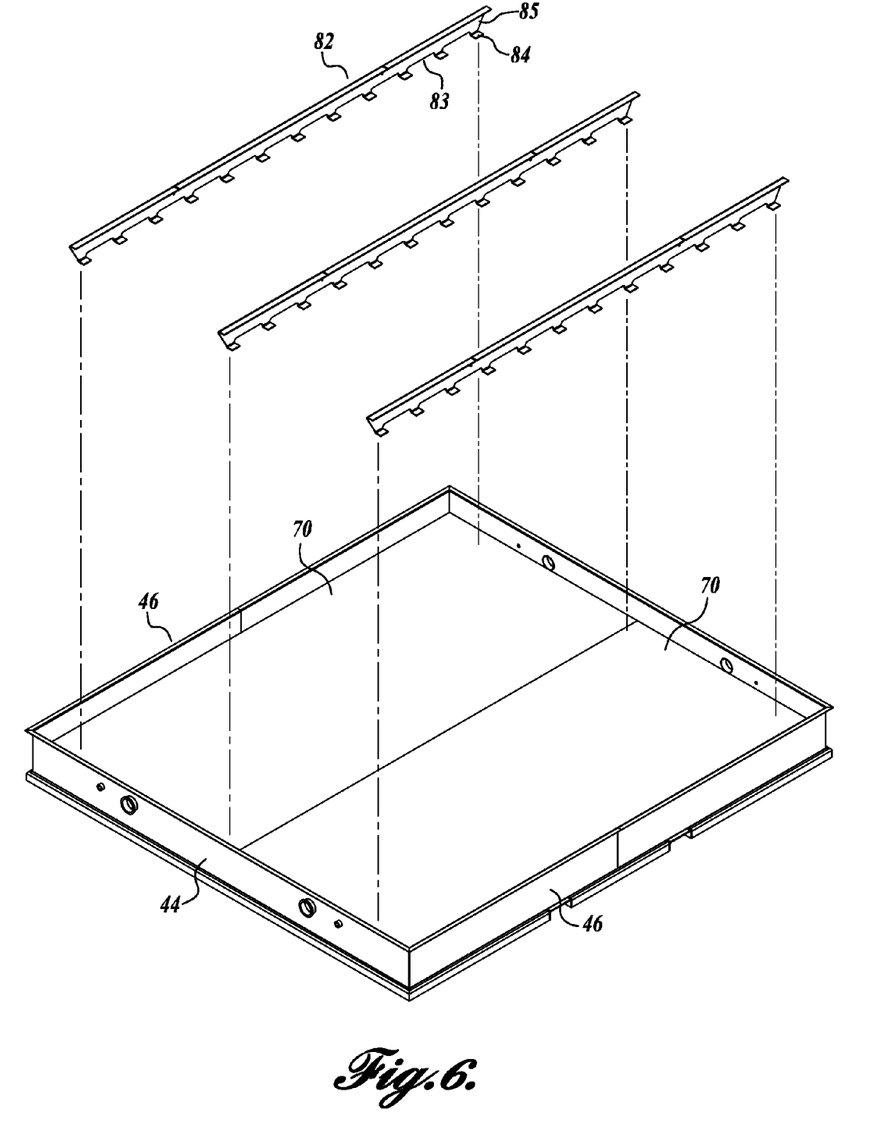
FIG. 6 is an isometric exploded view showing additional components of the floor structure of FIG. 3.
Figure 8:
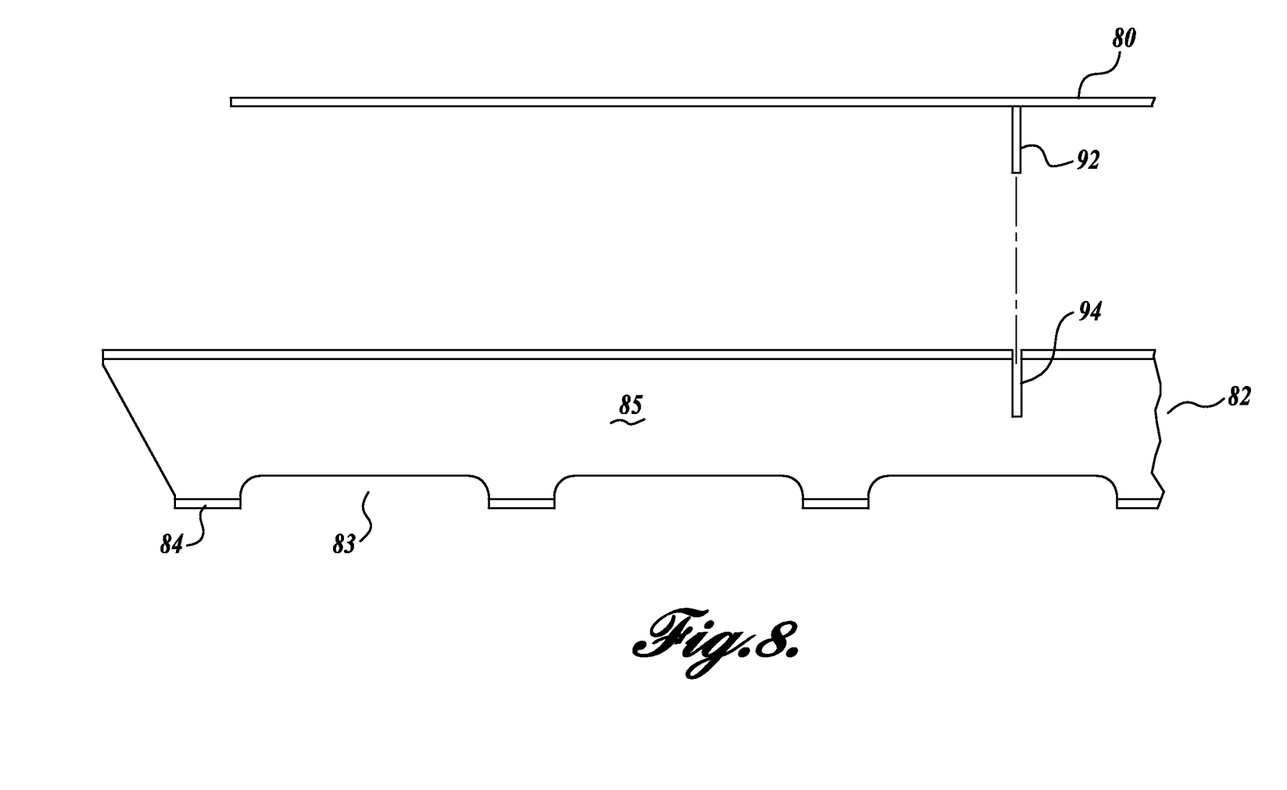
FIG. 8 is an enlarged fragmentary elevational view of components of the floor structure shown in FIGS. 6 and 7.

As most clearly shown in FIGS. 6, 8 and 10, the support members are generally in the shape of a channel. However, the lower flange is configured to define spaced-apart scallops 83 thereby to form a series of spaced-apart pads 84 that bear against the top surface of top sheet or layer 70. The scallops 83 extend upwardly a distance along the web 85 portion of the support member to form spaced apart longitudinal openings 86 along the length of the support members. The scalloped shape of the lower portion of the support members 82 reduces the contact surface between the support members and the top sheet or layer 70, which allows for easier welding of the support member to the top layer. This structure, by forming openings 86, also allows for mixing of air throughout the hollow upper layer 30.

As also shown in FIGS. 8 and 10, at the ends of the support members 82, the web sections 85 are angled inwardly in a downward direction. This reduces or minimizes cold bridging between the support member 82 and the exterior skin of the freezer enclosure defined by the sidewalls 44 of pan structure 40.

Although the support members 82 are illustrated as being of a channel shape, other shapes for the support members may be utilized. For example, the support members may be of a Z-shaped cross-section or an I-shaped cross-section.

Further, other or additional types of support members may optionally be utilized in conjunction with the support members 82. For example, a series of short cylindrical columns 90 may be spaced apart about the area of the top sheet or layer 70 to span between the top layer and the underside of the deck 80, see FIG. 7. To increase the load bearing area of the columns 90, the ends of the columns can be capped and/or the column can include flanges extending radially outwardly from one or both of the upper and lower ends of the columns The columns can be held in place by numerous means, including by welding.

Figure 7:
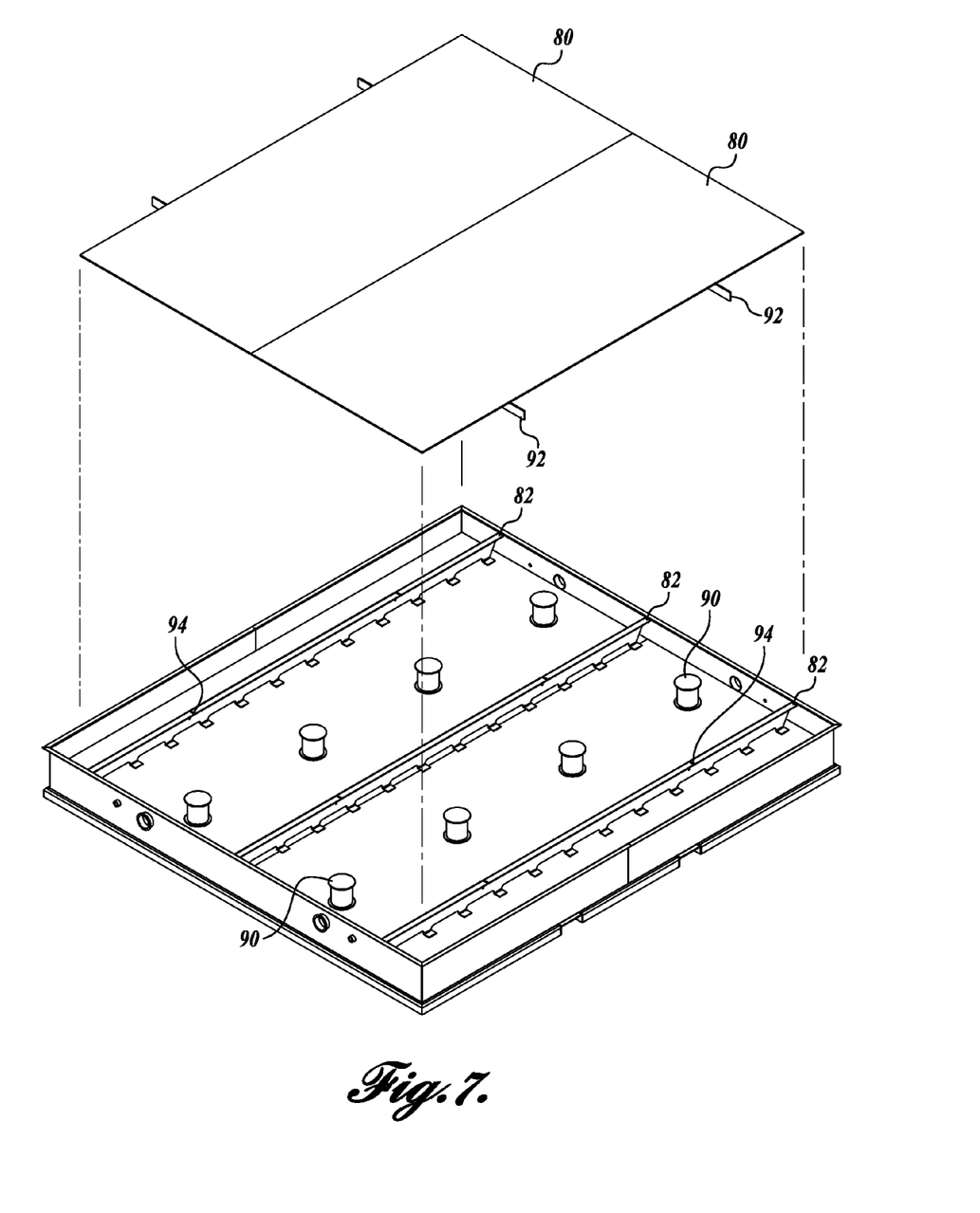
FIG. 7 is an exploded isometric view of FIG. 3, showing additional components of the floor structure of FIG. 3.

Referring to FIGS. 7, 8 and 10, a plurality of ribs or bars 92 extend beneath the deck 80, transversely to the support members 82. The bars 92 are welded or otherwise securely attached to the underside of the deck 80. The bars 92 closely engage within transverse slots 94 formed in the upper portion of the support members 82. As will be appreciated, bars 92 provide support for the deck in the direction transversely to the length of the support members 82.

It will be appreciated that the load carried by deck 80 is transferred downwardly through the support members 82 to the top sheet or layer 70 and then ultimately to the thermal insulating layer 66. To assist in carrying this load, a plurality of high density plastic rods or blocks 91 may be extended through the insulating layer 66 and through spacers 60 at locations disposed beneath the support members 82, and in particular the pads 84 of the support members. The blocks 91 may also be placed beneath the columns 90 described above. As a consequence loads on the deck 80 can be transmitted directly to the floor 42 of the pan structure 40. Blocks or rods 91 can be composed of a minimal thermal heat transfer material, such as PEEK or UHMW. These blocks or rods help ensure that the load from the deck 80 is transmitted down to the base 42 of the floor structure. Moreover, minimal thermal heat transfer will occur through the blocks or rods 91 and to the spacer member 60 or pan base surface 42.

As noted above, the thermal insulating layer 66 is encased in an envelope 68 of foil or other suitable material. This envelope is completely sealed. Accordingly, the areas in which the load blocks or rods 91 extend through the thermal insulating layer 66 are also sealed with foil tape or Mylar tape, or other appropriate sealing tape.

The floor structure 20 may be supported above the installation location of the freezer structure 12 by various means. As shown in FIGS. 4 and 9, a series of perimeter channel members 100 extend around the perimeter of the underside of the pan structure 40. Also two spaced-apart transverse channel members 102 extend across the underside of the pan structure 40 to support the interior of the pan structure. Of course, channel members similar to members 100 and 102 may be disposed otherwise about the underside of the pan structure 40. In addition, other support structures may be utilized in place of the channel members 100 and 102.

As shown in FIG. 11, a portion of a sidewall 22 is shown as extending upwardly from the floor structure 20. The construction of the sidewall 22 is very similar to that of a floor structure 20. As such, the comparable components of the sidewall 22 are identified with the same part numbers, but with a "prime" designation. As such, the construction of the sidewalls 22 will not be repeated here.

However, it is noted that the sidewall 46' of pan structure 40' has openings 52' therein so that the layer 30' of the sidewall is in fluid flow communication with the upper layer 30 of the floor structure 20. This enables the circulation system 18 to also circulate dry air and other fluids through the layer 30' of the sidewall 22, as described more fully below.

Although not shown, the freezer structure 12 can also include a ceiling 24 constructed similarly to the floor structure 20 and sidewalls 22. Further, the ceiling 24 can be composed of a substantially hollow layer similar to layers 30 and 30', and such substantially hollow layer of the ceiling can be in air flow communication with the substantially hollow layers 30' of the sidewalls. As a consequence, the substantially hollow layers of the floor structure 20, sidewalls 22, and ceiling 24 can all be in fluid/air flow communication with each other.

The side walls are seal-welded to the floor structure deck 80 and to the ceiling 24, as well as to each other. As a result, the interior of the freezer structure 12 is isolated from the substantially hollow layers 30 and 30'.

Next, referring to FIG. 1, circulation system 18 is schematically illustrated as being capable of circulating different types of fluids through the hollow upper/inner layers 30 and 30' of the freezer system 10. In this regard, during normal operations, very low dew point air from an air supply 120 is routed to openings 52 formed in the pan structure sidewall 44 via inlet line 122 connected to the air supply 120. The air supply supplies the low dew point air at dew point temperature of about −30° F. Pressure Dew Point (PDP), to −75° F. PDP. The continuous volume of the air supplied by the circulation system is sufficient to keep the floor structure, sidewalls, and ceiling of the freezer structure 12 in dry condition, as well as free from ice formation and bacteria growth. Moreover, the constant purging of dry air through layers 30 and 30' disrupts the convective heat transfer through these layers, thereby keeping the temperature therein substantially higher than the surface directly above the layers 30 and 30'.

The temperature of the low dew point air from the air supply may be altered depending on the temperature of the food or other work product entering the freezer structure 12, as well as the temperature, humidity, and other environmental conditions exterior of the freezer structure. To this end, the air supply system 120 is connected to and controlled by the control system 14. The control system is capable of operating the air supply to provide both very low dew point air to the freezer structure, but also to supply heated air to the freezer structure 12. This heated air can be used to melt any ice that may have formed within the floor structure 20, sidewalls 22, or ceiling 24, for example, if a breach or leak had occurred in the freezer structure, allowing moisture to enter the upper/inner layers 30 and 30' of the freezer structure.

As also shown in FIG. 1, as an alternative to air, the circulation system 18 can instead circulate an inert gas from a gas supply 130 through the floor and wall hollow layers 30 and 30'. Such inert gas may be used instead of the low dew point air. Examples of such gases include nitrogen and carbon dioxide. The operation of the gas supply 130 is also under the control system 14.

The circulation system 18 includes the capability of adding an anti-bacterial agent to either the inert gas from gas supply 130 or the air from air supply 120 so as to prevent bacteria from forming/growing in the floor structure 20, sidewalls 22, or ceiling 24, or to kill or otherwise eliminate bacteria that may have formed within the interior of the floor structure, sidewalls, and/or ceiling. Examples of suitable anti-bacterial agents include chlorine dioxide, and ozone. As with the air supply 120 and gas supply 130, the antibacterial supply 136 is controlled by the control system 14.

The circulation system 18 is also capable of circulating steam through the hollow layers of the floor structure 20, sidewalls 22 and ceiling 24 of the freezer structure. The steam may be provided by a steam supply 140. The steam can be introduced into inlet line 122, or a steam manifold, not shown, can be used to inject the steam directly into the layers 30 and 30'. The temperature and volume of the steam circulated through the hollow layers 30 and 30' is sufficient to readily kill bacteria and other pathogens that may be located therein. To this end, there must be a sufficient supply of culinary quality dry steam at 30 psig to raise the temperature of all surfaces in the space to 145° F. and maintain for a period of 15 minutes. As in the air supply 120, gas supply 130, and antibacterial agent supply 136, the steam supply 140 is also controlled by control system 14.

Continuing to refer specifically to FIG. 1, monitoring system 16 is provided to monitor specific conditions within the interior of the freezer floor, sidewalls, and ceiling. In this regard, a temperature sensor 150 is located within floor upper layer 30 to measure the temperature therein. This temperature can verify that the freezer is operating properly and also confirm the integrity of the floor above the hollow layer 30. The temperature sensor 150 is connected to the control system 14.

Monitoring system 16 also includes a pressure sensor 156 located within the hollow upper layer 30 of the floor structure. Such pressure sensor can also provide information regarding if there is a malfunction in the airflow through the upper layer 30 causing the pressure to rise above the safe limits of the structure. As with the temperature sensor, the pressure sensor is also connected to the control system 14.

The monitoring system 16 also includes a moisture sensor 158, located within the hollow layer 30, and/or a dew point sensor 160 to measure the dew point of the air entering layer 30. The moisture sensor and dew point sensor are both capable of indicating whether or not there is a breach in the integrity of the freezer flow, or if an icing condition is present within the follow layers 30 and/or 30'. As with the temperature and pressure sensors 150 and 156, the moisture and dew point sensors 158 and 160 are also connected to the control system 14. As set forth above, ideally, the cold dry air circulating through the hollow layers 30 and 30' is at about −30° F. pressure dew point (pdp) to −75° F. pdp. This air flow can be at about 2 cubic feet per minute (cfm) to a max of 8 cfm per 4 ft section of the floor space, where long dimension of the floor is divided into 4 ft sections.

Monitoring system 16 also includes a temperature sensor 170 for sensing the temperature in the third layer or zone below the thermal insulation layer 66. Temperature sensor 170 is used to measure this temperature. One reason for monitoring the temperature below the thermal insulating layer 66 is to determine if the freezer structure 12 is functioning properly and/or there is a breakdown in the upper layer 30 and/or intermediate layer 32. For example, if the temperature in the bottom layer 34, as measured by the sensor 170, is relatively low, there may be a breach in the upper layer 30 or perhaps a breakdown in the thermal insulating layer 66.

As noted above, the freezer system 10 includes a control system 14 to help ensure that the freezer system 10 is operating properly and that there is no breach of the floor structure 20, sidewalls 22, or ceiling 24. To this end, the temperature sensors 150 and 170, the pressure sensor 156, moisture sensor 158, and the dew point sensor 160 are all connected to the control system by hard wiring, radio frequency, or other wireless transmission means or otherwise. The control system monitors the operational parameters of the freezer structure 12 to determine whether or not such operational parameters are within the set points that have been predetermined for these operational parameters. When the operational parameters are within the set points, the freezer structure 12 is functioning properly.

The control system 14 includes a computer 200 for use in monitoring the monitoring system as well as controlling the circulation system. The control system also includes a suitable controller 202, such as a programmable logic controller linked to the computer and having an appropriate interface 204 for connecting the various sensors and components of the circulation system to the logic controller. A memory unit 206 is provided for storing information regarding the operation of the monitoring system and circulation system. A keyboard or other input device 209 is provided to enable the operator to communicate with the computer and/or logic controller. Also, a display or other output device 210 is provided to convey information from the computer or control system to the operator, including the functioning of the circulation system 18. Rather than employing both a logic controller 202 and a computer 200, the control system may include only one of these components. If only a logic controller is used, the logic controller will have the needed processing capability required to open to the monitoring system and circulation system. If only a computer is used, then the computer will have the necessary interface between the computer and the sensors of monitoring system and the components of the circulating system.

The control system 14, more specifically the computer 200 together with the controller 202, controls the operation of the circulation system. In this regard, the temperature and humidity of the air or gas circulated through the hollow layers 30 and 30' are controlled. The control system also controls whether to not the air from the air supply 120 is heated, for example, to thaw ice that may have formed within the hollow layers 30 and 30'. The control system also controls whether or not an antibacterial agent is introduced into the air supply circulating through the floor, sidewalls, and ceiling. Further, the control system controls the operation of the steam supply 140 when desired to introduce steam into the hollow layers 30 and 30', for instance, to clean the interior of the hollow layers.

In the control system 14, the computer 202 may operate under a process control program to control the operation of the circulation system 18. The process control program may include a specific temperature and humidity profile that is desired so as to maintain the interior of the hollow layers 30 and 31 in substantially dry condition and prevent the formation of ice or the growth of bacteria or other pathogens. In addition, the control system may operate under a process deviation program that seeks to adjust one or more system parameters to enable the freezer structure to operate within preset parameters. In this regard, the control program may utilize one or more proportional-integral-derivative (PID) controller algorithms, which function to adjust one or more of the temperature and volumetric air supply to the freezer structure so that moisture does not accumulate within the floor, sidewalls, or ceiling and also so that ice does not form therein, and so that bacteria or other pathogens do not grow therein.

Rather than seeking to automatically adjust the operating parameters of the circulation system, the control system 14 may instead alert operators to the deviation of the affected process parameters from the preselected set point. The system can, in addition, suggest adjustments to be made to the temperature and/or flow rate of the circulation air. Thereupon the operator can make the indicated adjustments.

It will be appreciated that the freezer system described above advantageously provides two separate zones under the freezer floor surface, the freezer side wall surface, and the freezer ceiling surface. The layers or zones directly below the inside surface of the floor, walls and ceiling constitute a conditioned space that allows for the monitoring of temperature and the dew point within such space. This space is continually purged with a supply of very low dew point air to keep the space not only dry, but also free from ice formation and bacterial growth. This space also has the capability to be steam- or gas-sanitized as required. Through monitoring of this space, the operator is able to detect critical changes in the integrity of the floor above the space via change in measurement parameters. The second zone or layer below the upper or first layer or zone constitutes a completely sealed, insulated space that will not be impacted if a breach were to occur in the first or upper zone. Moreover, the third layer or zone below the insulated second zone or layer is monitored for temperature and moisture. This insulated space is not in direct contact with the internal floor of the freezer, and thus is subjected to less severe thermal stresses than in prior art freezer floor designs. Monitoring of the second zone or space also provides an indication of the integrity of the entire freezer structure.

The embodiments of the invention in which an exclusive property or privilege is claimed are defined as follows:

1. A thermally insulated floor structure for an industrial refrigeration system, comprising:
    a first zone of substantially hollow configuration, said first zone configured to support a load-bearing deck thereon;
    a second zone disposed beneath the first zone, and substantially isolated from the first zone at least in part by a rigid interface structure between the first and second zones, said second zone substantially occupied by a thermally insulating material, said thermally insulating material enclosed in a fluid impervious envelope; and
    said first zone comprising at least one inlet through which a fluid medium enters the first zone for circulation through the first zone, and at least one outlet through which the circulating medium exits the first zone.

2. The thermally insulated floor structure for an industrial refrigeration system of claim 1, wherein said second zone is substantially sealed from the exterior of the second zone including the rigid interface structure.

3. The thermally insulated floor structure for an industrial refrigeration system of claim 1, wherein the fluid impervious envelope comprises a material selected from foil and polyethylene terephthalate.

4. The thermally insulated floor structure for an industrial refrigeration system of claim 1, wherein:
    the thermally insulating material has a top surface facing the first zone and a bottom surface facing away from the first zone,
    a barrier wall underlies the bottom surface of the thermally insulating material, and
    the bottom surface of the thermally insulating material is spaced from the barrier wall to form a substantially hollow third zone.

5. The thermally insulated floor structure for an industrial refrigeration system of claim 4, wherein the bottom surface of the thermally insulating material is supported a distance away from the barrier wall by a pervious support structure.

6. The thermally insulated floor structure for an industrial refrigeration system of claim 1, wherein said thermally insulating material is selected from a group comprising polyisocyanurate, polyurethane, and polystyrene.

7. The thermally insulated floor structure for an industrial refrigeration system of claim 1, further comprising spacers for spacing the second zone above a surface beneath the second zone.

8. The thermally insulated floor structure for an industrial refrigeration system of claim 1, wherein, with the exception of the at least one inlet and the at least one outlet, the first zone is substantially sealed with respect to the ingress or egress of fluids.

9. The thermally insulated floor structure for an industrial refrigeration system of claim 1, further comprising first load-bearing members extending through the first zone for supporting the load-bearing deck over the first zone.

10. The thermally insulated floor structure for an industrial refrigeration system of claim 9, further comprising second load-bearing members extending through the second zone for supporting the first load-bearing members.

11. The thermally insulated floor structure for an industrial refrigeration system of claim 1, further comprising a third zone disposed beneath the second zone, said third zone being substantially hollow and substantially closed from the environment.

12. The thermally insulated floor structure for an industrial refrigeration system of claim 11, wherein said third zone is formed by spacers disposed between the second zone and a surface beneath the second zone.

13. The thermally insulated floor structure for an industrial refrigeration system of claim 1, further comprising first load-bearing members extending through the first zone for supporting the load-bearing deck over the first zone.

14. The thermally insulated floor structure for an industrial refrigeration system of claim 13, further comprising second load-bearing members extending through the second zone for supporting the first load-bearing members.

15. A thermally insulated floor structure comprising:
a first zone of substantially hollow configuration, said first zone configured to support a load-bearing deck thereon;
a second zone disposed beneath the first zone, and substantially isolated from the first zone, said second zone substantially occupied by a thermally insulating material, said thermally insulating material enclosed in a fluid impervious envelope;
said first zone comprising at least one inlet through which a fluid medium enters the first zone for circulation through the first zone, and at least one outlet through which the circulating medium exits the first zone;
a barrier wall overlying the surface of the thermally insulting material opposite the first zone; and
wherein the surface of the thermally insulating material opposite the first zone is supported a distance away from the barrier wall to form a third zone by a pervious support structure.

16. A thermally insulated floor structure for an industrial refrigeration system, comprising:
a first zone of substantially hollow configuration, said first zone configured to support a load-bearing deck thereon, said deck disposed toward the interior of the refrigerated volume;
a second zone disposed beneath the first zone and substantially isolated from the first zone at least in part by a first barrier wall between the first and second zones, said second zone substantially occupied by a thermally insulating material, said thermally insulating material enclosed in a fluid impervious envelope;
a second barrier wall underlying the thermally insulating material, with the thermally insulating material spaced above the second barrier wall to form a substantially hollow third zone beneath the second zone.

17. The thermally insulated floor structure for an industrial refrigeration system of claim 16, wherein said second zone is substantially sealed from the exterior of the second zone including from the first barrier wall disposed between the first and second zone.

18. The thermally insulated floor structure for an industrial refrigeration system of claim 16, further comprising spacers extending through the second zone for spacing the second zone above a surface beneath the second zone.

19. The thermally insulated floor structure for an industrial refrigeration system of claim 16, wherein said third zone is formed by spacers disposed between the second zone and a surface beneath the second zone.

20. The thermally insulated floor structure for an industrial refrigeration system of claim 16, wherein the thermally insulating material having a bottom surface, the bottom surface is supported a distance away from the second barrier wall by a pervious support structure.

21. The thermally insulated floor structure for an industrial refrigeration system of claim 16, further comprising at least one inlet in the first zone through which a fluid medium enters the first zone for circulation through the first zone, and at least one outlet in the first zone through which the circulating medium exits the first zone.

22. The thermally insulated floor structure for an industrial refrigeration system of claim 21, wherein, with the exception of the at least one inlet and the at least one outlet, the first zone is substantially sealed with respect to the ingress or egress of fluids.

* * * * *

UNITED STATES PATENT AND TRADEMARK OFFICE
CERTIFICATE OF CORRECTION

| | | |
|---|---|---|
| PATENT NO. | : 9,334,649 B2 | Page 1 of 1 |
| APPLICATION NO. | : 13/930810 | |
| DATED | : May 10, 2016 | |
| INVENTOR(S) | : J. C. O'Connor et al. | |

It is certified that error appears in the above-identified patent and that said Letters Patent is hereby corrected as shown below:

TITLE PAGE

| COLUMN | LINE | ERROR |
|---|---|---|
| (72) Pg. 1, col. 1 | Inventors | "Joshua Chun, V, Denver, CO (US);" should read --Joshua Chun, Denver, CO (US);-- |

Signed and Sealed this
Second Day of August, 2016

Michelle K. Lee
*Director of the United States Patent and Trademark Office*